(12) United States Patent
Tischer et al.

(10) Patent No.: US 7,522,722 B2
(45) Date of Patent: *Apr. 21, 2009

(54) SYSTEM AND METHOD FOR INTERFACING PLAIN OLD TELEPHONE SYSTEM (POTS) DEVICES WITH CELLULAR DEVICES IN COMMUNICATION WITH A CELLULAR NETWORK

(75) Inventors: Steven Tischer, Atlanta, GA (US); Kevin Kleinfelter, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 804 days.

This patent is subject to a terminal disclaimer.

(21) Appl. No.: 10/929,712

(22) Filed: Aug. 30, 2004

(65) Prior Publication Data

US 2005/0025305 A1 Feb. 3, 2005

Related U.S. Application Data

(63) Continuation-in-part of application No. 10/195,197, filed on Jul. 15, 2002, now Pat. No. 7,194,083.

(51) Int. Cl.
H04M 1/00 (2006.01)
H04M 9/00 (2006.01)
(52) U.S. Cl. .............................. 379/413.03; 379/399.01
(58) Field of Classification Search ............ 379/399.01, 379/413.03
See application file for complete search history.

(56) References Cited

U.S. PATENT DOCUMENTS

| | | | | |
|---|---|---|---|---|
| 4,866,762 A | | 9/1989 | Pintar | 379/200 |
| 5,774,793 A | * | 6/1998 | Cooper et al. | 455/418 |
| 5,905,950 A | | 5/1999 | Anell | 455/421 |
| 6,134,235 A | * | 10/2000 | Goldman et al. | 370/352 |
| 6,704,580 B1 | * | 3/2004 | Fintel | 455/550.1 |
| 6,778,824 B2 | * | 8/2004 | Wonak et al. | 455/426.2 |
| 7,194,083 B1 | * | 3/2007 | Tischer et al. | 379/399.01 |
| 2004/0132438 A1 | | 7/2004 | White | 455/418 |
| 2004/0240647 A1 | | 12/2004 | Tiliks et al. | 379/114.14 |

OTHER PUBLICATIONS

U.S. Official Action dated Jul. 6, 2007 in U.S. Appl. No. 11/637,264.

* cited by examiner

*Primary Examiner*—Alexander Jamal
(74) *Attorney, Agent, or Firm*—Moazzam & Associates, LLC

(57) ABSTRACT

A system and method are presented for interfacing multiple plain old telephone system (POTS) devices with multiple cellular devices in communication with a cellular network to enable efficient communication among these devices. In a broad sense, the system includes an interface configured to function as a bridge between the POTS devices and the cellular devices. The interface selectively routes call attempts from a POTS device to one of a group of cellular devices which connect the calls from the POTS device over the cellular network. The interface may be configured to detect a key sequence for selecting a particular cellular device in the group during an outgoing call attempt from the POTS device. The interface then routes the outgoing call to the selected cellular device. The interface may also be configured to detect a telephone number entered into the POTS device during an outgoing call attempt and route the outgoing call to a particular cellular device based on criteria pre-programmed in the interface. The interface may also be configured to generate distinctive signaling, such as ring tones, for the POTS devices to distinguish incoming calls to the group of cellular devices.

22 Claims, 17 Drawing Sheets

SYSTEM AND METHOD FOR INTERFACING PLAIN OLD TELEPHONE SYSTEM (POTS) DEVICES WITH CELLULAR DEVICES IN COMMUNICATION WITH A CELLULAR NETWORK

CROSS REFERENCE TO RELATED APPLICATIONS

This patent application is a continuation-in-part of U.S. patent application Ser. No. 10/195,197, entitled "System and Method for Interfacing Plain Old Telephone System (POTS) Devices With Cellular Networks," filed on Jul. 15, 2002 now U.S. Pat. No. 7,194,083 and assigned to the same assignee as this application.

FIELD OF INVENTION

The present invention relates generally to telecommunications and, more particularly, to a system and method for interfacing plain old telephone system (POTS) devices with cellular devices in communication with a cellular network.

BACKGROUND

The telephone has greatly facilitated communications between parties, especially when great distances separate the parties. Metropolitan cities and suburbs typically have sufficient access to a public switched telecommunications/telephone network (PSTN), as well as cellular networks. As access to PSTN and cellular networks has increased, a single subscriber may have several telephony devices, including plain old telephone system (POTS) devices and cellular telephones, available for use. As a result of having multiple telephony devices in the home, solutions have been developed involving cellular phone docking stations which enable the use of POTS devices over a cellular network. These solutions, however, fail to account for matching multiple cellular phone lines with multiple POTS lines including the ability to select a cellular phone line for use with one or more selected POTS devices as well as the ability to provide distinctive signaling for POTS devices receiving calls from one of several cellular phone lines.

SUMMARY

A system and method are provided for interfacing plain old telephone system (POTS) devices with cellular devices in communication with a cellular network. Briefly described, in architecture, one illustrative embodiment, among others, may be seen as a system including an interface configured to selectively route call attempts from a POTS device to one of a group of cellular devices which connect the calls from the POTS device over the cellular network. The interface may be configured to detect a key sequence for selecting a particular cellular device in the group during an outgoing call attempt from the POTS device. The interface then routes the outgoing call to the selected cellular device. The interface may also be configured to detect a telephone number entered into the POTS device during an outgoing call attempt and route the outgoing call to a particular cellular device based on criteria pre-programmed in the interface. The interface may also be configured to generate distinctive ring tones for the POTS devices to distinguish incoming calls to the group of cellular devices.

Other systems, methods, features, and advantages will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE ILLUSTRATIVE EMBODIMENTS

Reference will now be made in detail to the description. While several illustrative embodiments of the invention will be described in connection with these drawings, there is no intent to limit it to the illustrative embodiment or illustrative embodiments disclosed therein. On the contrary, the intent is to cover all alternatives, modifications, and equivalents included within the spirit and scope of the invention as defined by the claims.

Figure 1:
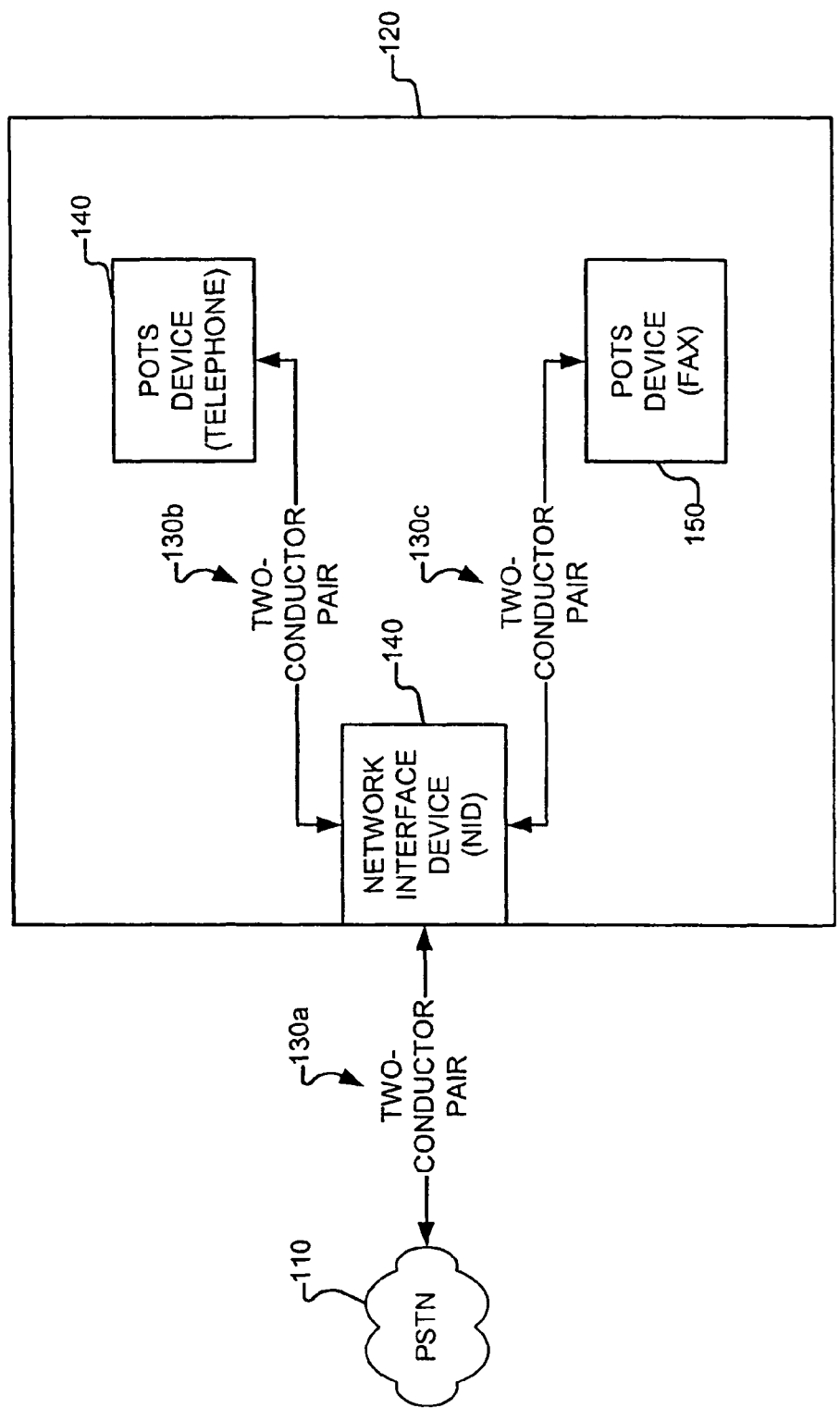
FIG. 1 is a block diagram showing a conventional plain old telephone system (POTS) connection to a telephone company through a network interface device.

FIG. 1 is a block diagram showing a conventional plain old telephone system (POTS) connection to a public switched telephone network (PSTN) 110 through a network interface device (NID) 140. Since such connections are well known, only a cursory discussion is presented here. As shown in FIG. 1, several POTS devices 140, 150 occupy a location 120 (e.g., home, business, etc.). Each POTS device 140, 150 is connected to the NID 140 by two-conductor pair wires 130*b*, 130*c*, also known as POTS pairs, or twisted pairs. The NID 140 serves as the interface between the POTS devices 140, 150 and the PSTN 110, wherein the ND 140 is connected to the PSTN 110 through at least a two-conductor pair 130*a* or landline 130*a*. As evident from FIG. 1, if the landline 130*a* is severed, or if the landline 130*a* is unavailable due to geographical limitations, then the POTS devices 140, 150 within the location 120 have no connection to the PSTN 110.

Figure 2:
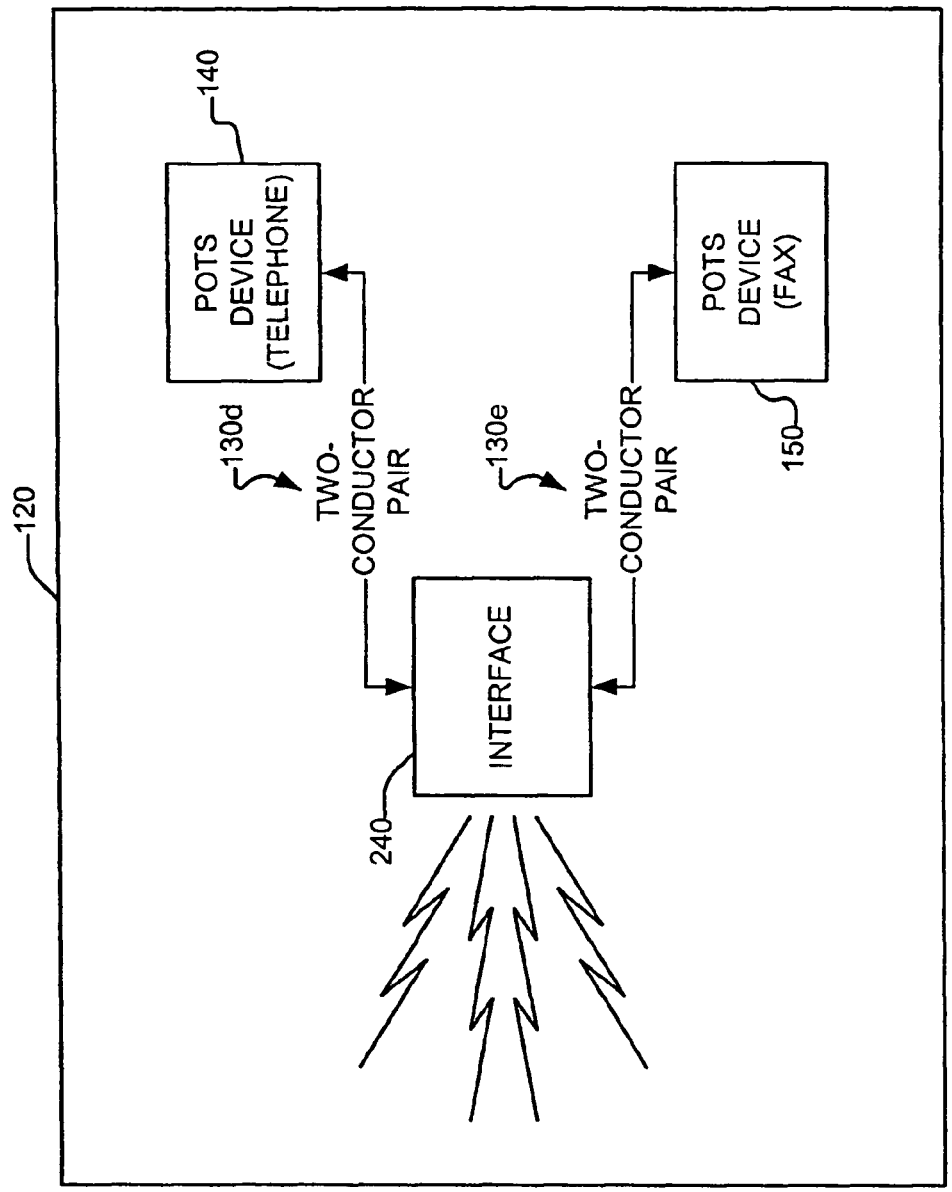
FIG. 2 is a block diagram showing one illustrative embodiment of the system for interfacing POTS devices with cellular networks.

FIG. 2 is a block diagram showing one illustrative embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface 240, thereby permitting connection between the POTS devices 140, 150 and a cellular network. In this sense, the POTS devices 140, 150 are connected to the interface 240, rather than an NID 140 (FIG. 1), by two-conductor pair wires 130*d*, 130*e*. Since the interface 240 is a bridge between the POTS devices 140, 150 and the cellular network, the interface 240 is configured to receive POTS compatible signals from the POTS devices 140, 150 and convert the POTS compatible signals to cellular network compatible signals, which are transmitted from the interface 240 to the cellular tower 250. Additionally, the interface 240 is configured to receive cellular network compatible signals from the cellular tower 250 and convert the cellular network compatible signals to POTS compatible signals, which are then forwarded to the POTS devices 140, 150 for use within the location 120. While a specific PSTN network is now shown in FIG. 2, it will be clear to one of ordinary skill in the art that the cellular tower 250 may be connected to a PSTN network, thereby permitting communication with other PSTN devices.

Figure 3:
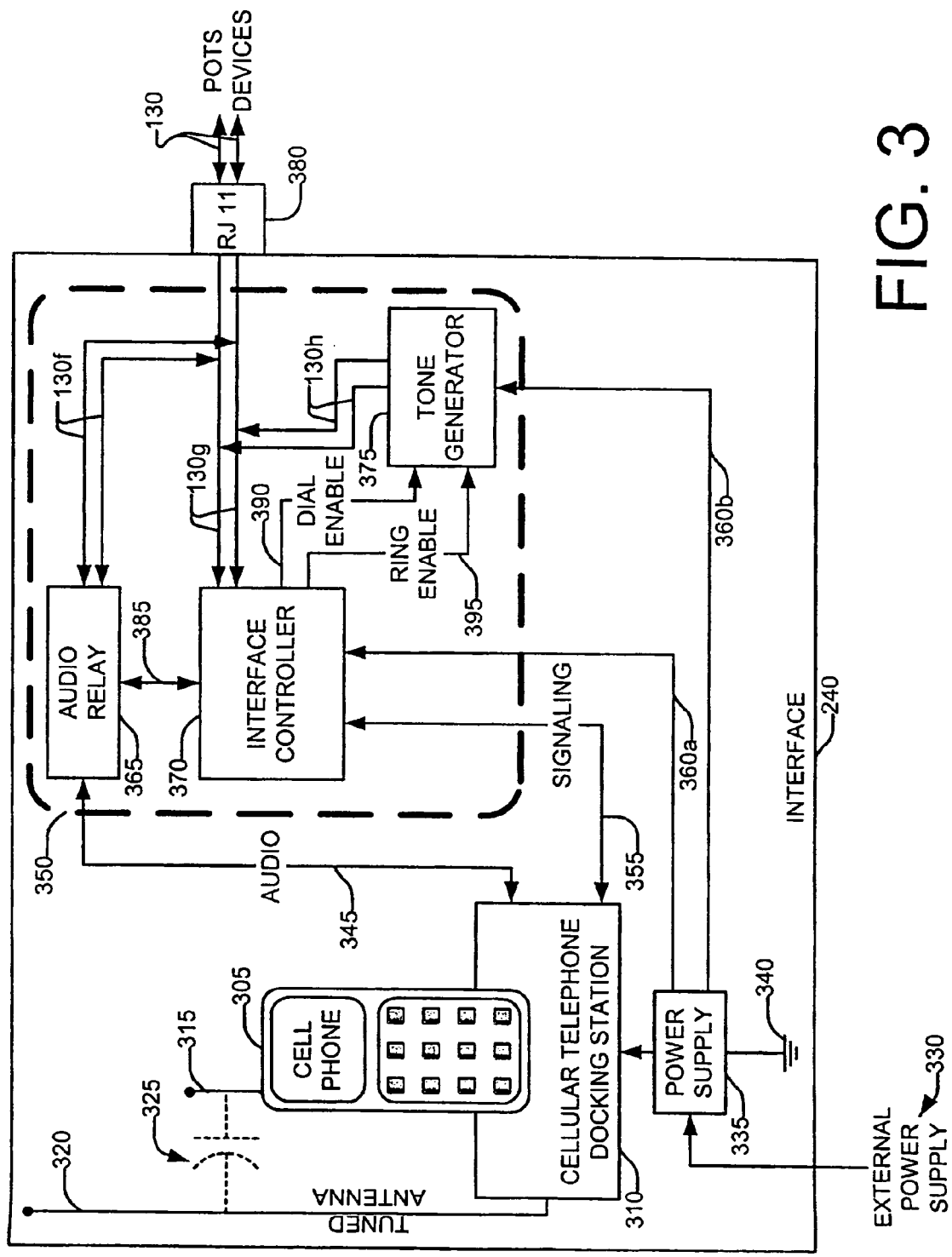
FIG. 3 is a block diagram showing one illustrative embodiment of the interface of FIG. 2.

FIG. 3 is a block diagram showing, in greater detail, a preferred illustrative embodiment of the interface 240 of FIG. 2. In the preferred illustrative embodiment, the cellular network compatible signals are transmitted and received at the interface 240 by a cellular telephone 305 while the POTS compatible signals are transmitted and received at the interface 240 through a POTS connector 380, such as an RJ11 connector 380. Thus, in the preferred illustrative embodiment, the interface 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitive coupling 325, as shown in FIG. 3.

In addition to interfacing with a cellular telephone 305 through one of a variety of conventional connectors (not shown), the cellular phone docking station 310 is configured to receive signaling data through signaling line 355, which may include commands associated with outgoing telephone calls. Thus, in one illustrative embodiment, the signaling data on signaling line 355 may be indicative of a telephone number. The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 305 may modify the signaling data on signaling line 355 appropriately (e.g., amplify, attenuate, reformat, etc.), or, alternatively, the cellular phone docking station 305 may relay the signaling data on signaling line 355 without modification. Regardless of whether or not the signaling data on signaling line 355 is modified, several aspects of the conveyed signal are discussed below, in greater detail, with reference to other components 350 associated with the interface 240.

In addition to the cellular phone docking station 310, the interface 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2)), the audio relay 365 receives analog-audio signals 345 from the cellular phone docking station 310 and transmits the analog-audio signals 345 to the POTS devices 140, 150 (FIG. 2) through the POTS connector (e.g., RJ11 connector) 380. Similarly, for outgoing analog-audio signals 345 (i.e., audio from the POTS devices 140, 150 (FIG. 2) to the cellular telephone 305), the analog audio signals 345 are received by the audio relay 365 through the POTS connector 380 and transmitted to the cellular phone docking station 310. Thus, the audio relay 365 provides a bidirectional communication link for the analog-audio signals 345 between the POTS devices 140, 150 (FIG. 2) and the cellular phone docking station 310. In a preferred illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS connector 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data, therefore, 355 instructs the cellular telephone 305 to dial the number. In one illustrative embodiment, when the number has been dialed and the called party picks up the phone, the cellular telephone 305 detects the connection and conveys an analog-audio signal 345 to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS connector 380. In this illustrative embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on signaling line 355, rather than as an analog-audio signal 345. In this illustrative embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS connector 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this illustrative embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one illustrative embodiment, the information is conveyed to the interface controller 370 through the audio relay 365. Thus, in this illustrative embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS device 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

In another illustrative embodiment, the information is conveyed to the interface controller 370 through signaling data on signaling line 355. Thus, in this illustrative embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

Figure 4:
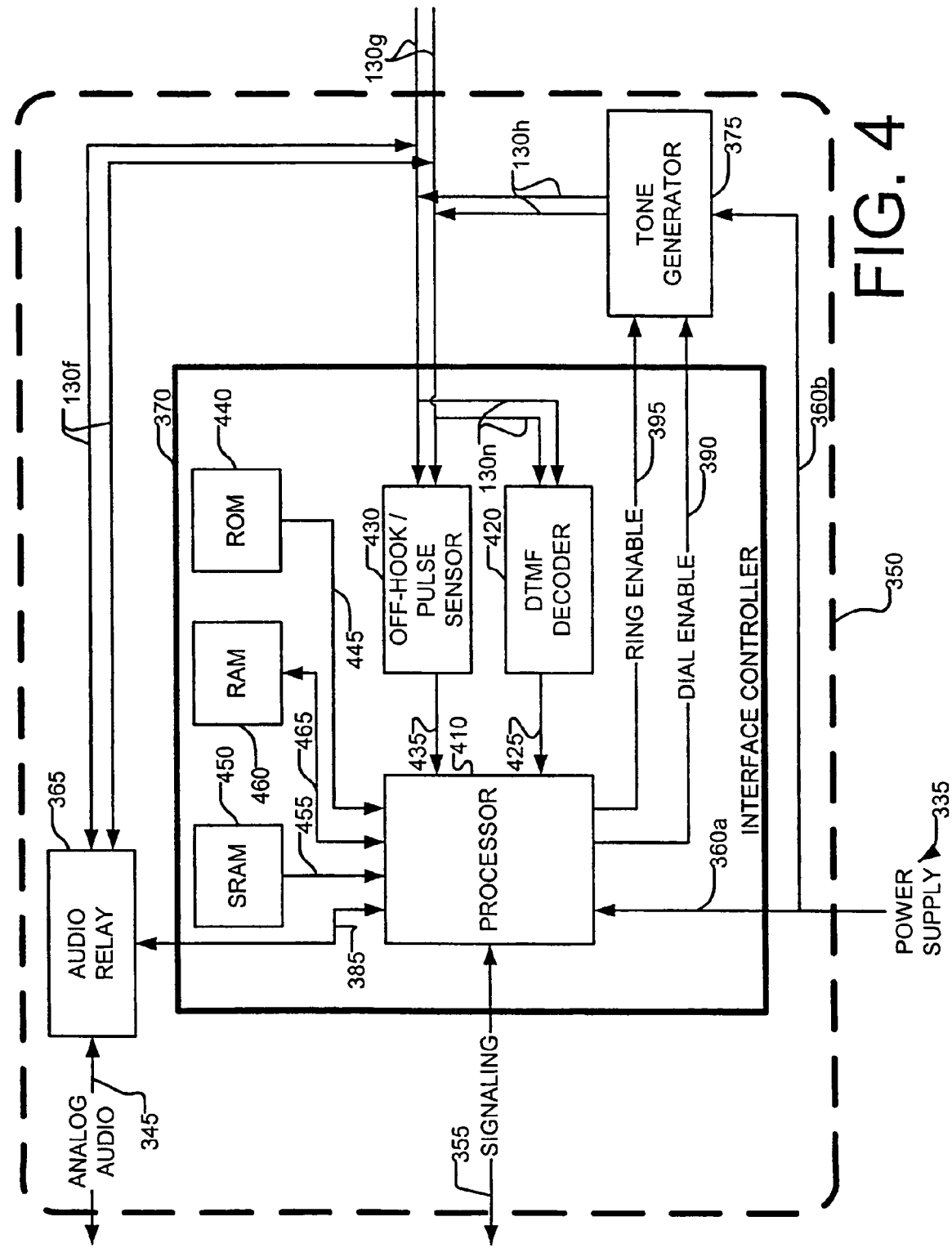
FIG. 4 is a block diagram showing one illustrative embodiment of the hardware within the interface of FIG. 3.

FIG. 4 is a block diagram showing the interface controller 370 of FIG. 3 in greater detail. The interface controller 370 is shown in FIG. 4 as comprising a processor 410, random-access memory (RAM) 460, read-only memory (ROM) 440, static-random-access memory (SRAM) 450, an off-hook/pulse sensor 430, and a dual-tone multi-frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS connector 380 (FIG. 3) through the two-conductor pair wires 130g. Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150 (FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one illustrative embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another illustrative embodiment, the RAM stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represent a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various illustrative embodiments of the system will permit the interfacing of POTS devices 140, 150 (FIG. 2) with a cellular network. Specifically, in one illustrative embodiment, POTS devices 140, 150 (FIG. 2) are interfaced with the cellular network through a cellular telephone 305 (FIG. 3), which is attached to the interface 240 at a cellular phone docking station 310. In addition to the various systems, as described above, another illustrative embodiment of the invention may be seen as a method for interfacing POTS devices 140, 150 (FIG. 2) with cellular networks. Several illustrative embodiments of the method are described with reference to FIGS. 5 through 12 below.

Figure 5:
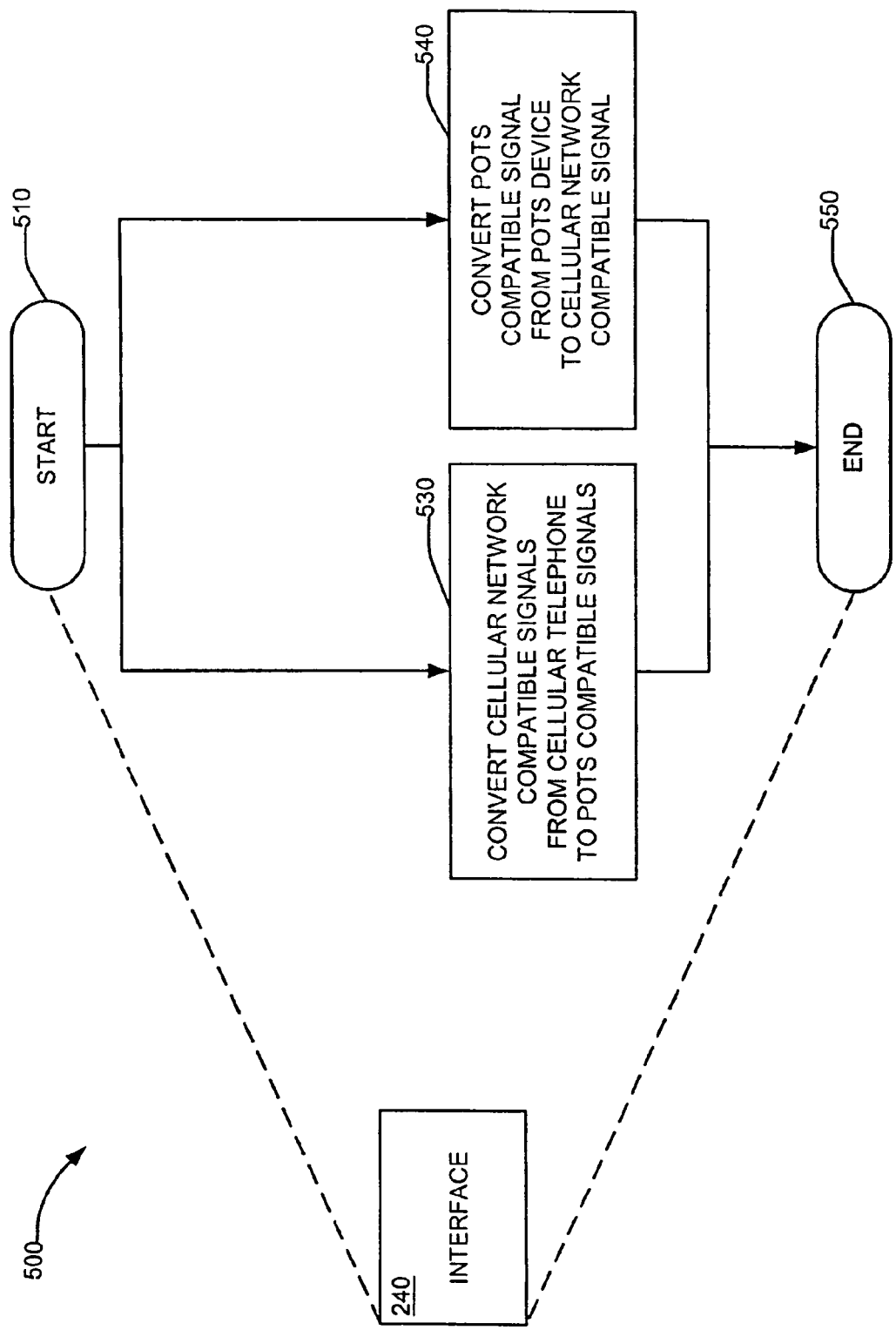
FIG. 5 is a flowchart showing one illustrative embodiment of the method for interfacing POTS devices with cellular networks.

FIG. 5 is a flowchart showing one illustrative embodiment of the method for interfacing POTS devices with cellular networks. In a broad sense, once a POTS device 140, 150 (FIG. 2) has been coupled to a cellular telephone 305 (FIG. 3) through an interface 240 (FIG. 2), this illustrative embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred illustrative embodiment, the converting steps 530, 540 are performed at the interface 240.

Figure 6A:
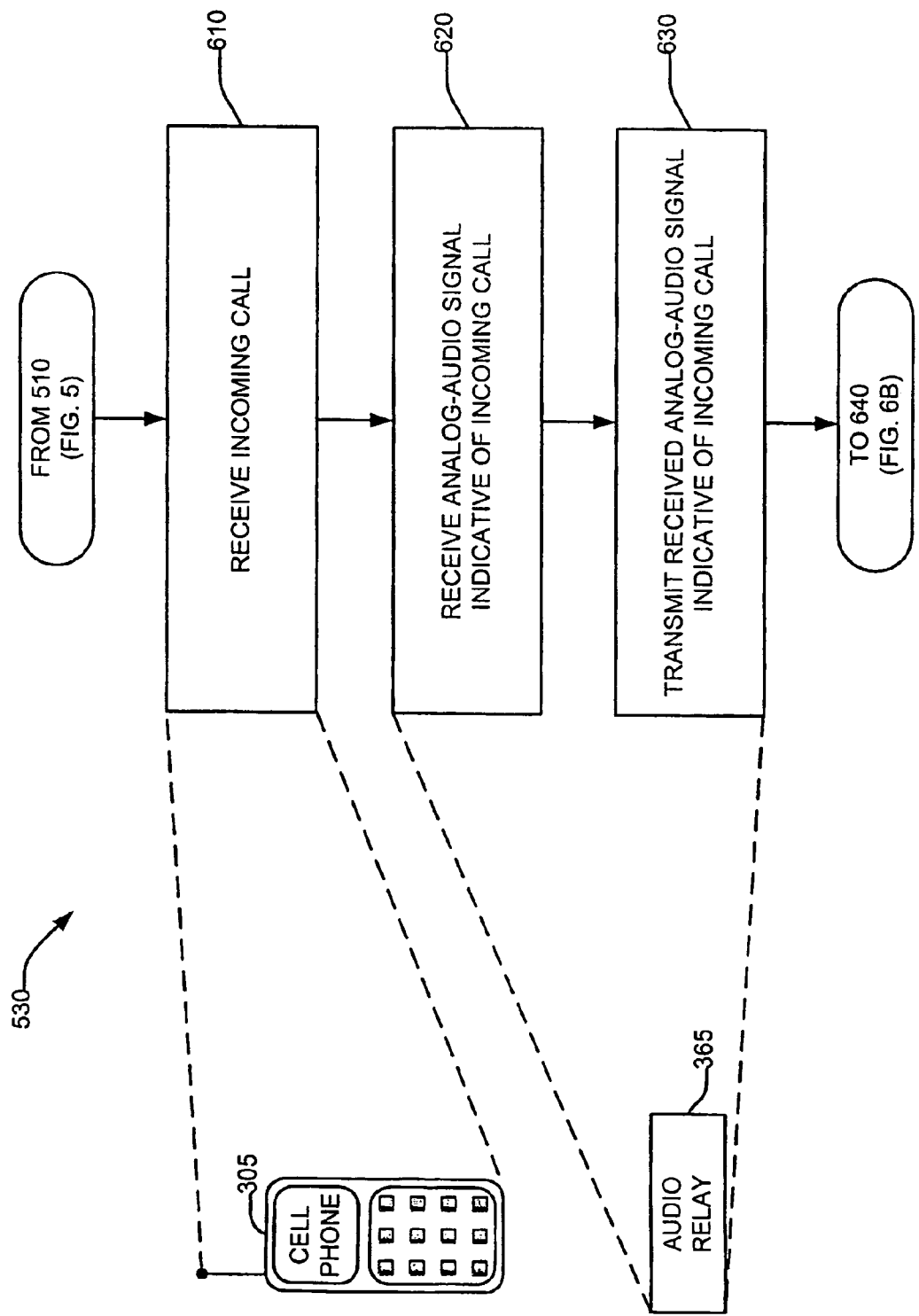
FIGS. 6A and 6B are flowcharts showing one illustrative embodiment of the method associated with the conversion of cellular network compatible signals to POTS compatible signals.
Figure 6B:
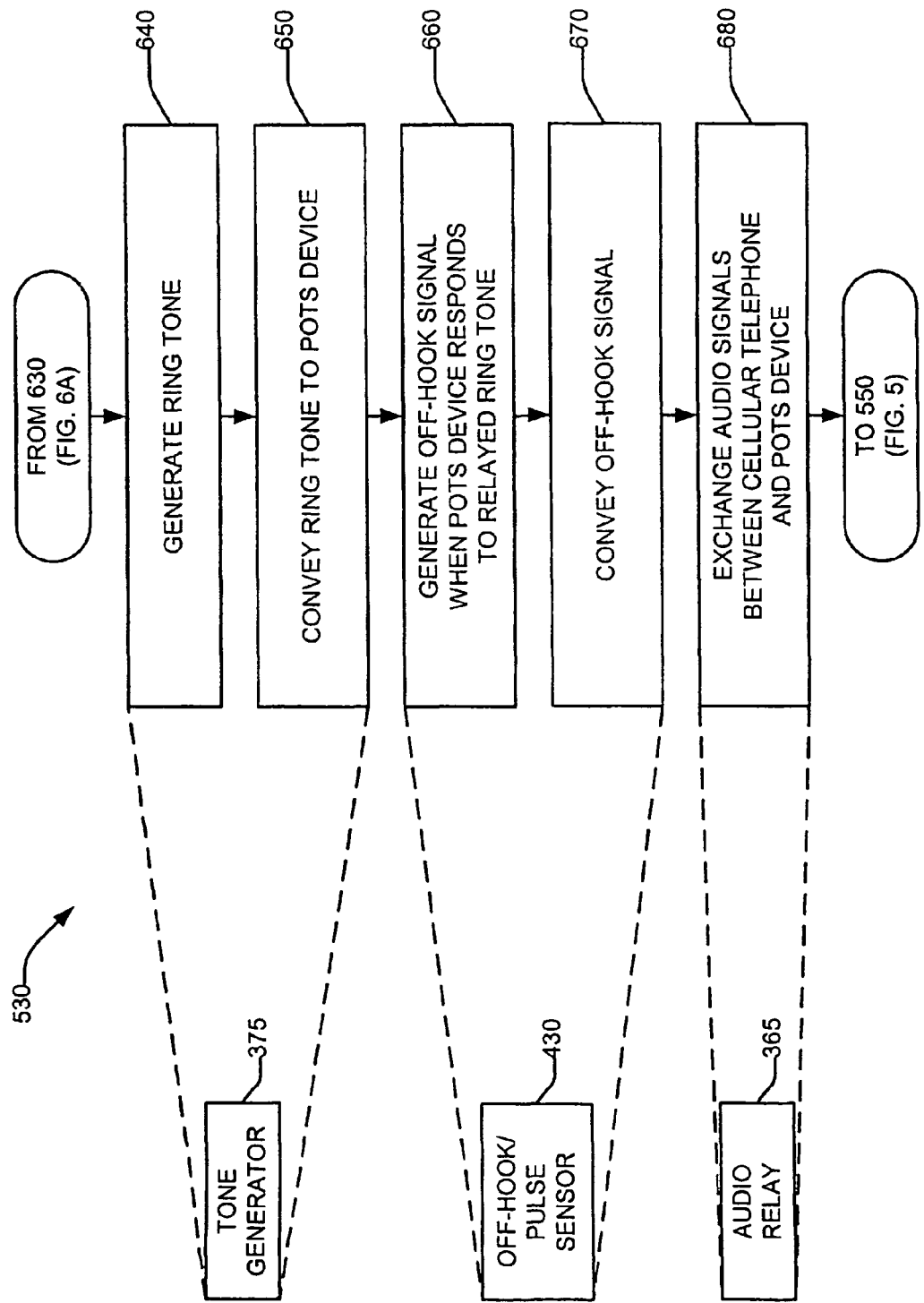

FIGS. 6A and 6B are flowcharts showing one illustrative embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred illustrative embodiment, the ring tone is generated 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7A:
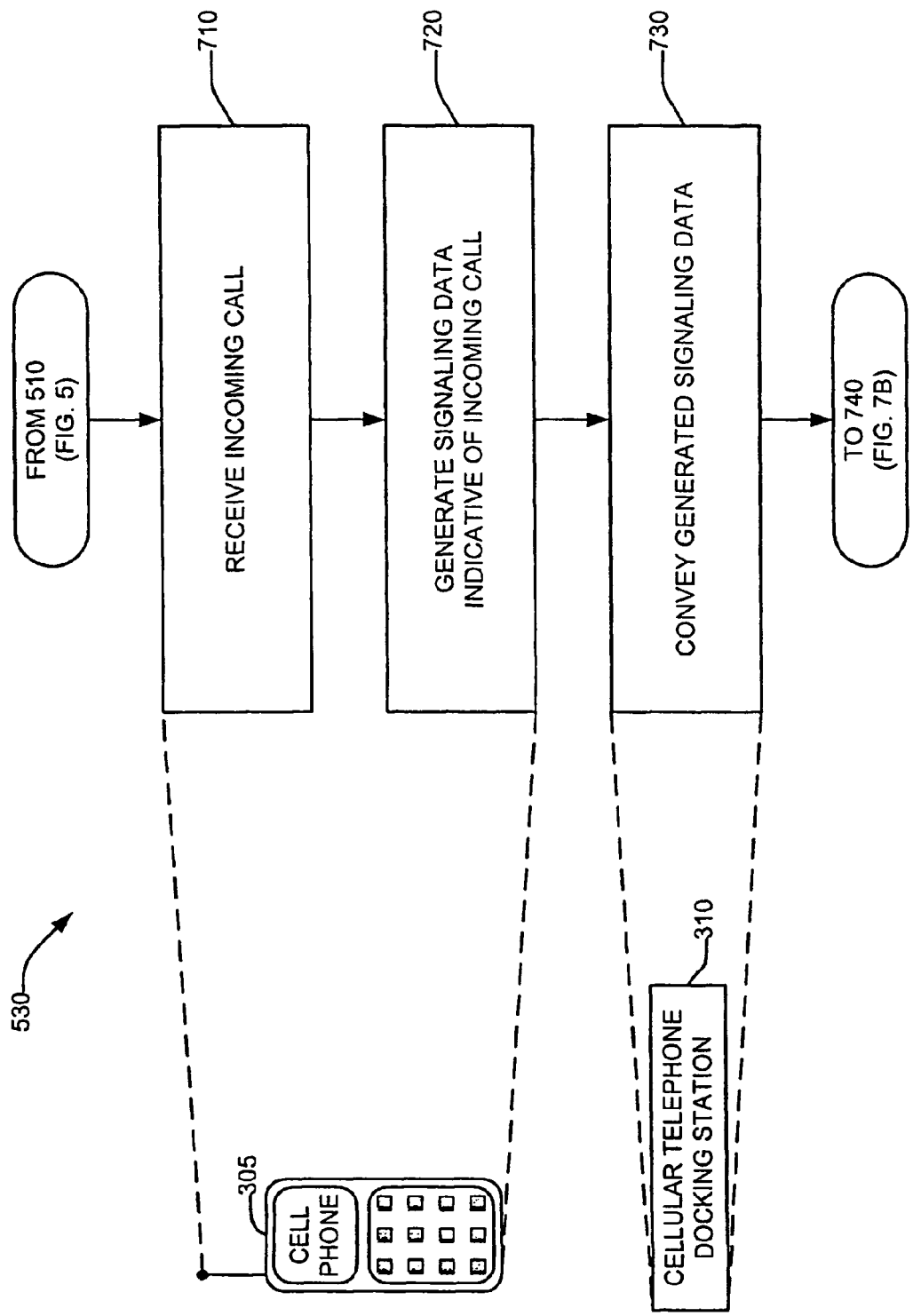
FIGS. 7A and 7B are flowcharts showing another illustrative embodiment of the method associated with the conversion of cellular network compatible signals to POTS compatible signals.
Figure 7B:
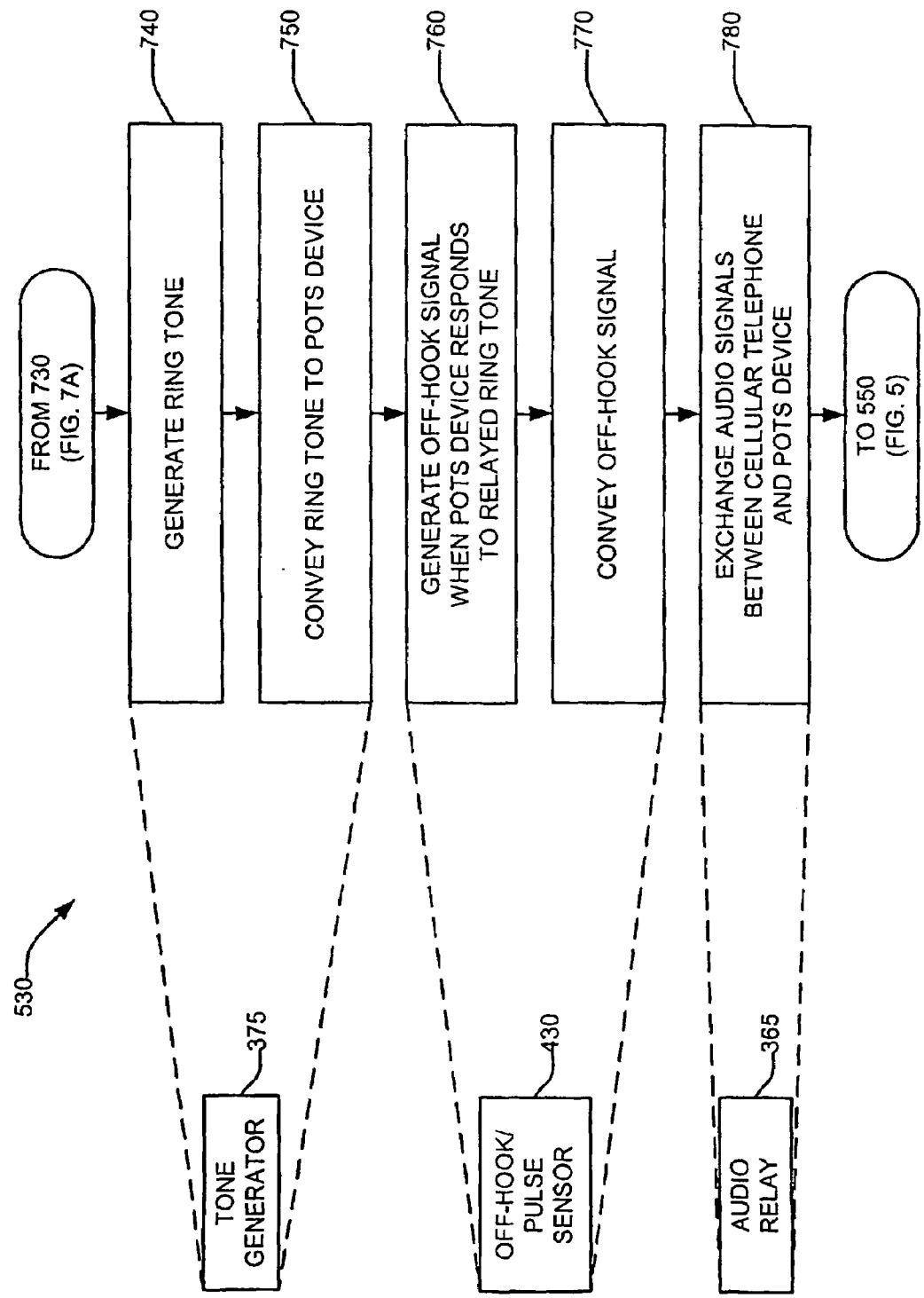

FIGS. 7A and 7B are flowcharts showing another illustrative embodiment of the method associated with the conversion 530 of cellular network compatible signals to POTS compatible signals. Similar to FIGS. 7A and 7B, the cellular network compatible signals here are received through the cellular telephone 305 (FIG. 3). Thus, in step 710, the system receives an incoming call through the cellular telephone 305 (FIG. 3). However, unlike the illustrative embodiment of FIGS. 6A and 6B, once the incoming call is received 710, the system generates, in step 720, signaling data on signaling line 355 (FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred illustrative embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 8:
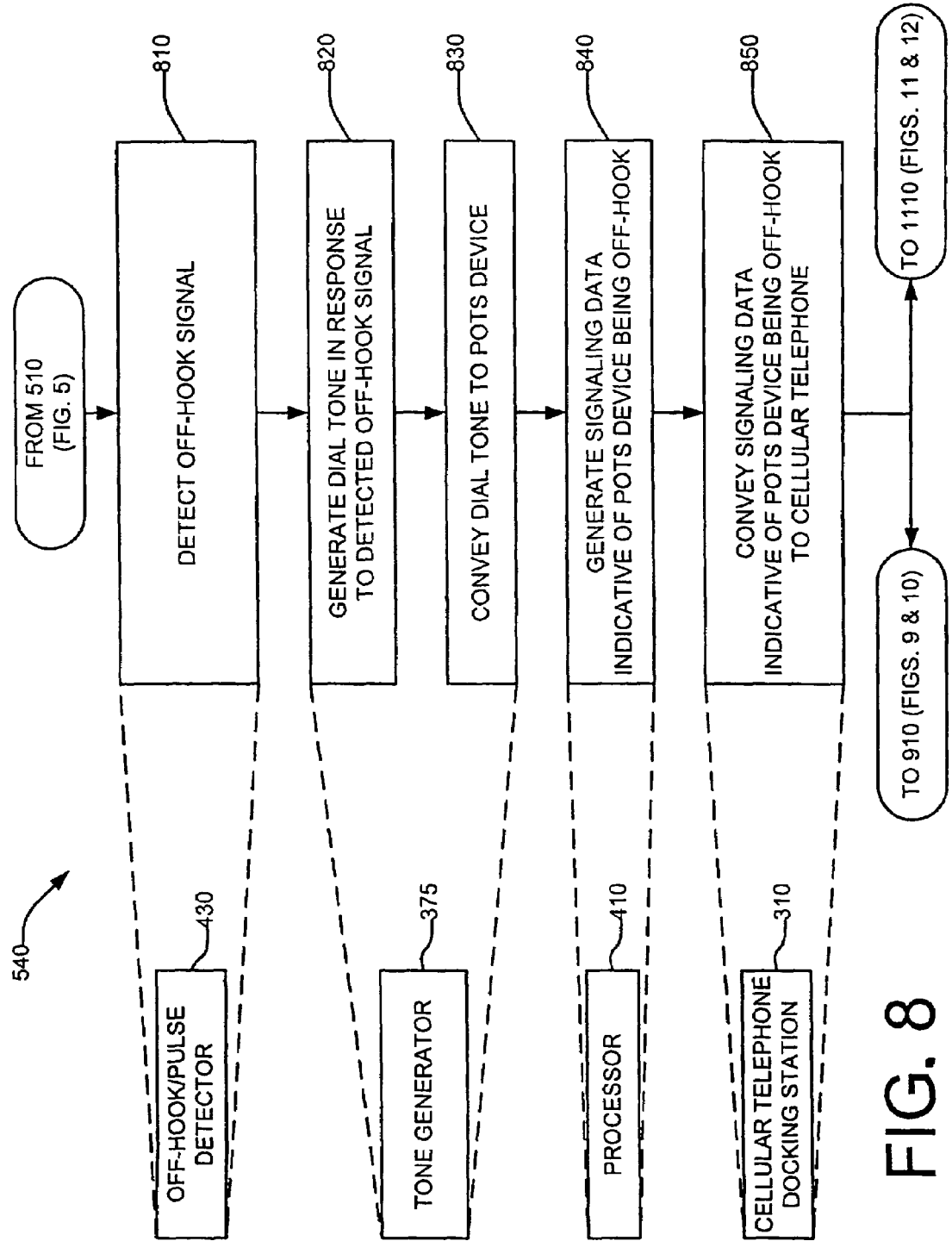
FIG. 8 is a flowchart showing several steps associated with the conversion of POTS compatible signals to cellular network compatible signals.

FIG. 8 is a flowchart showing several steps associated with the conversion 540 of POTS compatible signals to cellular network compatible signals. As described above, the interface 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In an illustrative embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating 820 the dial tone, the system further generates, in step 840, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one illustrative embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another illustrative embodiment, the step of generating 840 signaling data on signaling line 355 (FIG. 3) may be completely.

Figure 9:
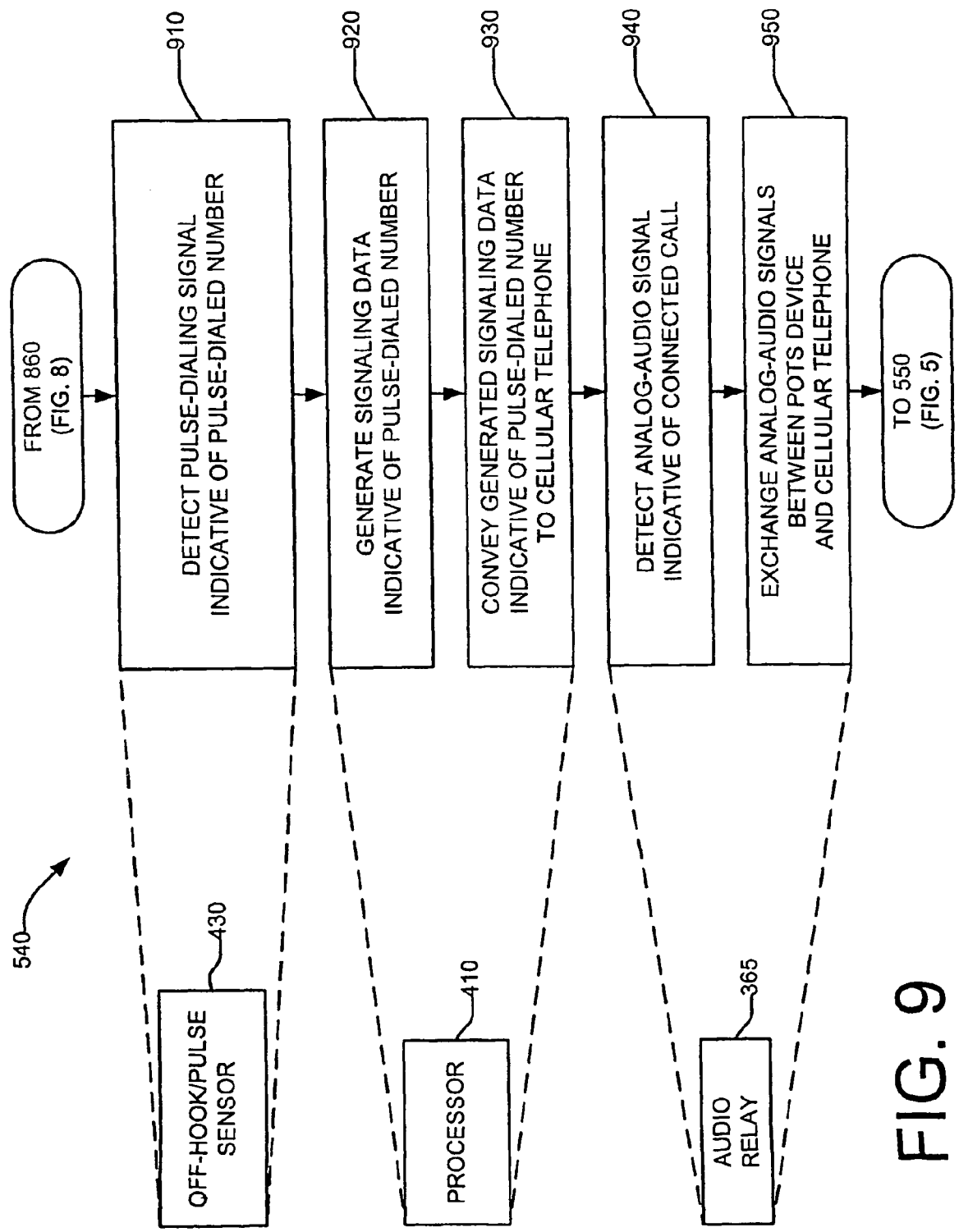
FIGS. 9 through 12 are flowcharts showing several illustrative embodiments of the method associated with the conversion of POTS compatible signals to cellular network compatible signals.
Figure 10:
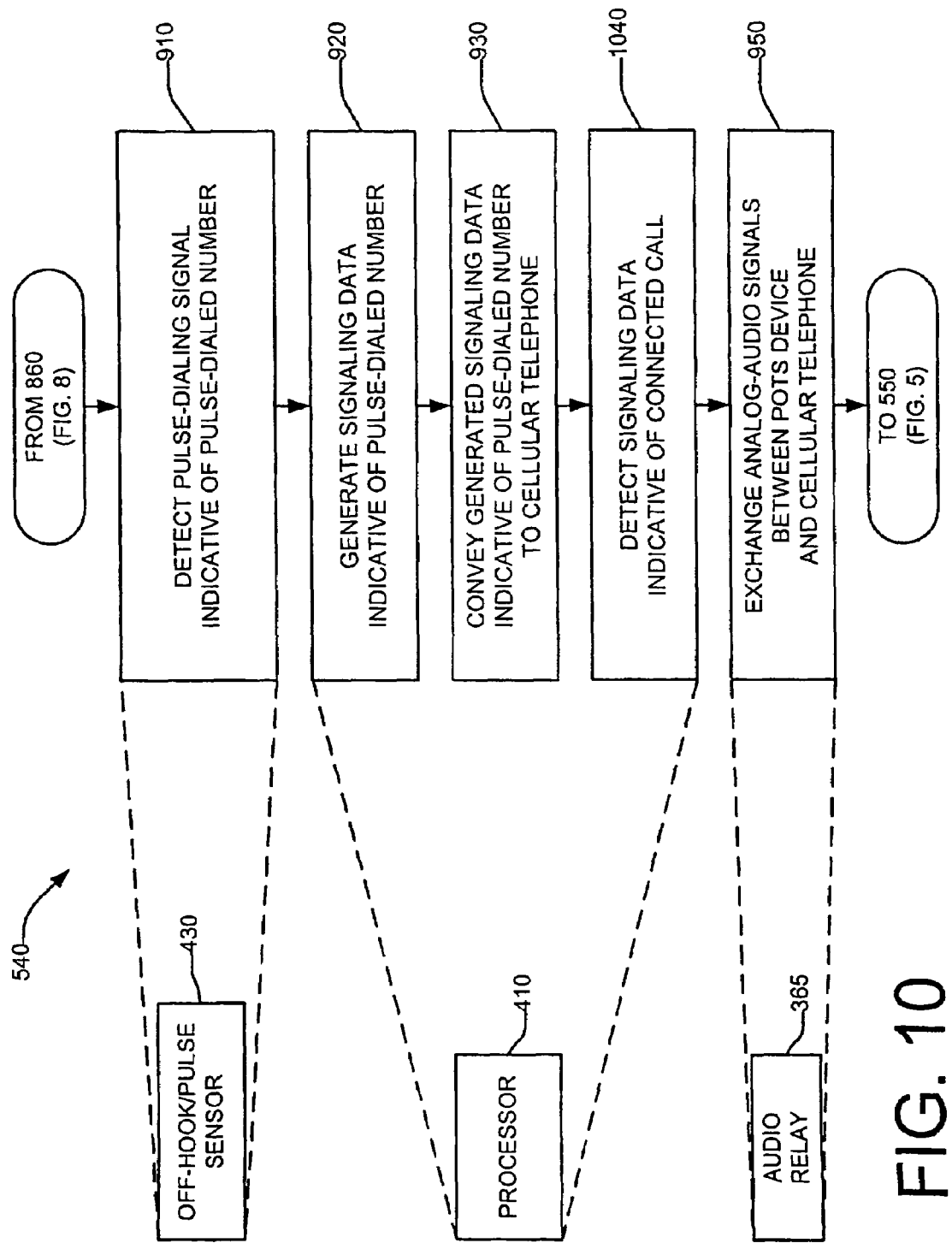

FIGS. 9 and 10 are flowcharts showing several illustrative embodiments of the method associated with pulse dialing. As shown in FIG. 9, in one illustrative embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one illustrative embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another illustrative embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data on signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy"

signal is detected, the cellular telephone 305 (FIG. 3) and the POTS device 140, 150 (FIG. 2) are connected through the cellular network.

FIG. 10 is a flowchart showing, in greater detail, another illustrative embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1040, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
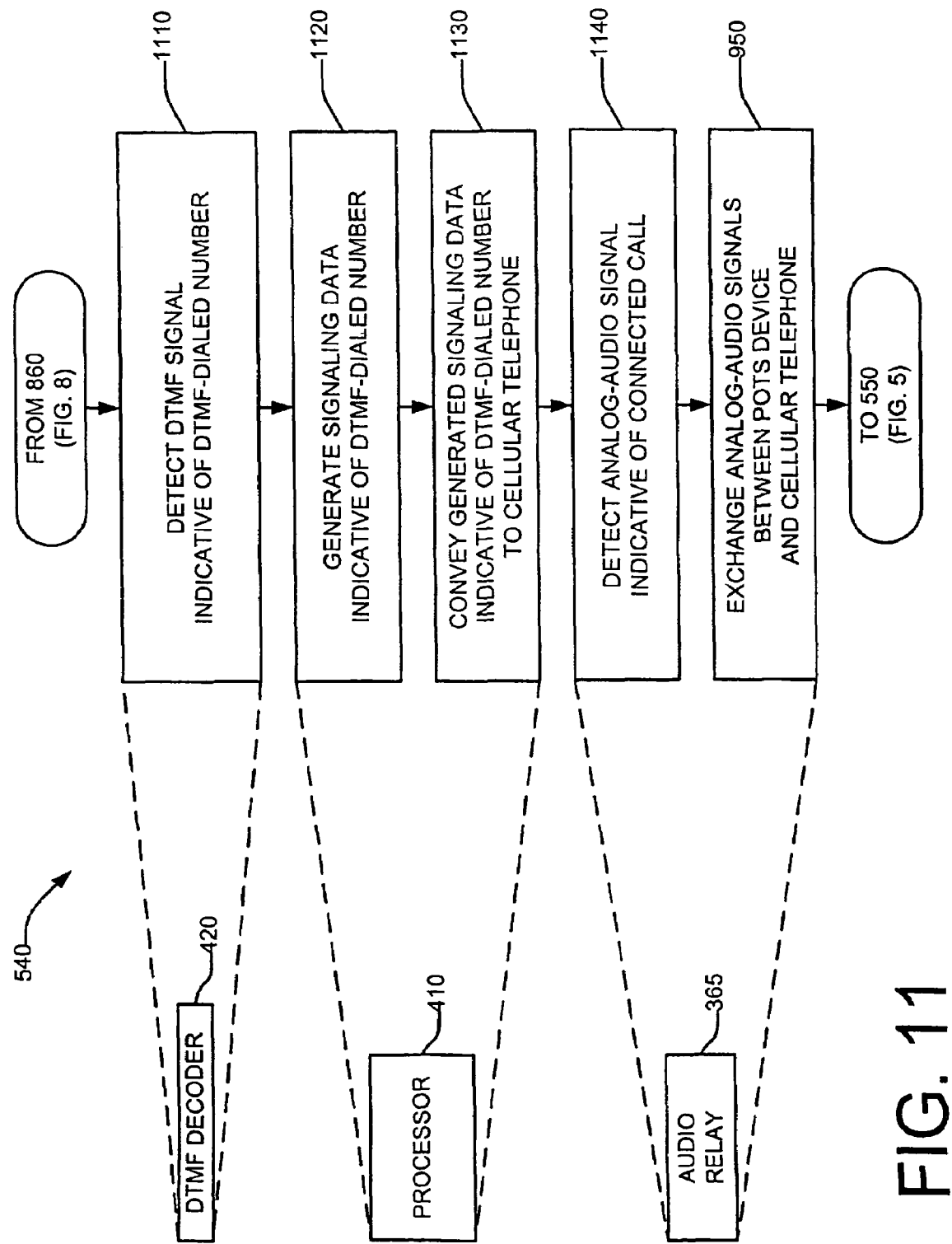
Figure 12:
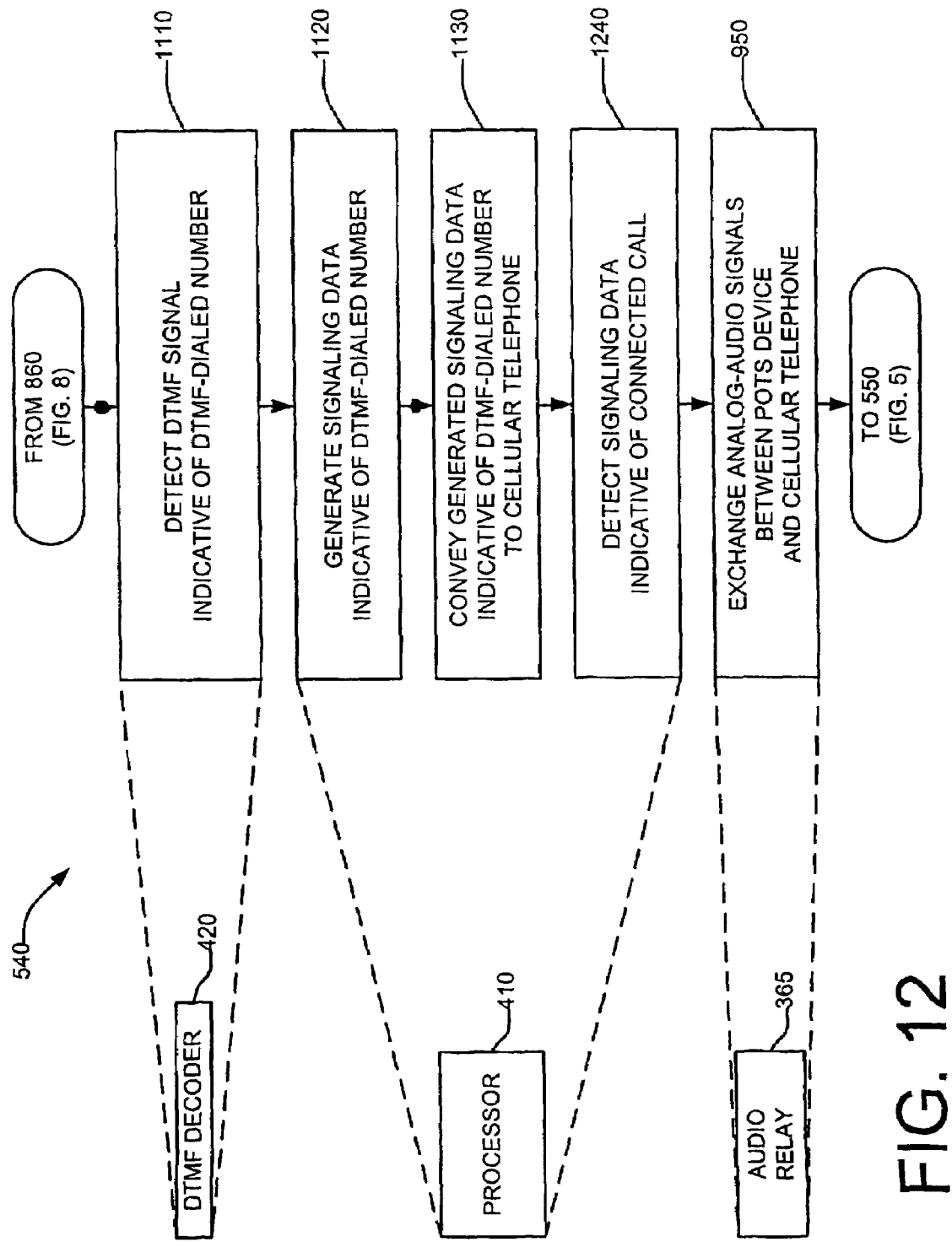

FIGS. 11 and 12 are flowcharts showing several illustrative embodiments of the method associated with "tone" dialing. As shown in FIG. 11, in one illustrative embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another illustrative embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, again, the POTS device 140, 150 (FIG. 2) freely communicates through the cellular network.

Figure 13:
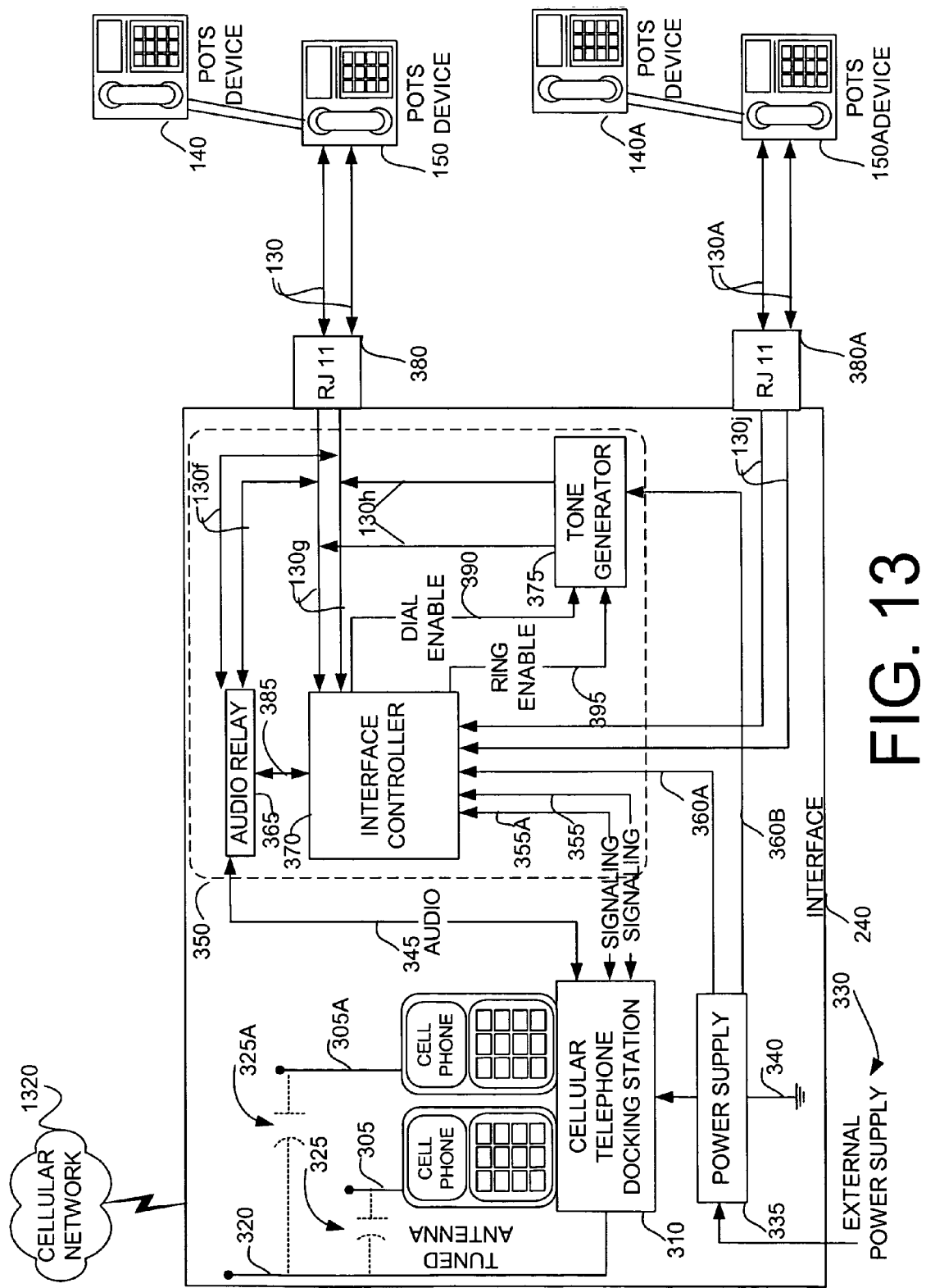
FIG. 13 is a block diagram showing an alternative illustrative embodiment of the interface 240 of FIG. 2.

FIG. 13 is a block diagram showing an alternative illustrative embodiment of the interface 240 of FIG. 3. In this illustrative embodiment, cellular network compatible signals are transmitted and received at the interface 240 by cellular telephones 305, 305A while the POTS compatible signals are transmitted and received at the interface 240 through POTS connectors 380 and 380A which may be RJ11 connectors. The interface 240 in this illustrative embodiment is in communication with cellular network 1320 and comprises the cellular telephone docking station 310 which is configured to interface with the cellular telephones 305, 305A, the interface controller 370, the audio relay 365, and the tone generator 375.

The cellular phone docking station 310 may also have a tuned antenna 320 that is configured to improve transmission and reception by the cellular telephone 305, thereby providing a more robust connection to the cellular network 1320 through the cellular tower 250 (FIG. 2). The tuned antenna 320 may be coupled to the antennas of the cellular telephones 305 and 305A in a non-destructive, non-contact, or capacitative manner, for example, using capacitive coupling 325 and 325A, as shown in FIG. 13. In other illustrative embodiments, the tuned antenna 320 may also have a directly coupled antenna connector in addition to or instead of the capacitative coupling 325.

The cellular telephone docking station 310 is configured to convey signaling data, received from the interface controller 370 over the signaling line 355, to the cellular telephone 305. The cellular telephone docking station 310 is further configured to convey signaling data, received from the interface controller 370 over the signaling line 355A, to the cellular telephone 305A. In the presently described illustrative embodiment, the signaling data on the signaling lines 355 and 355A may include a DTMF-dialing signal indicative of a dialed number sequence, such as a telephone number or other key sequence, from the POTS devices 140, 150 and 140A, 150A.

The interface controller 370 is configured to convey signaling data indicative of a dialed number sequence to the cellular telephones 305 and 305A through the cellular telephone docking station 310. The interface controller 370 includes the DTMF decoder 420, the ROM 440, the RAM 460, and the processor 410 discussed above with respect to FIG. 4. The DTMF decoder 420 (FIG. 4) generates a dialing signal corresponding to a dialed number sequence initiated from the POTS devices 140, 150 and 140A, 150A.

As discussed above with respect to FIG. 4, the DTMF decoder 420 is configured to detect dialing from POTS devices 140, 150 and 140A, 150A that are configured for DTMF or "tone" dialing. The DTMF decoder 420 (FIG. 4) generates a DTMF-dialing signal of the telephone number or key sequence that was dialed and transmits the signal to the processor 410 (FIG. 4), which converts the DTMF-dialing signal into signaling data on the signaling line 355, for the cellular telephone 305, and on the signaling line 355A, for the cellular telephone 305A, that is indicative of the number or key sequence that was dialed. During normal operation, the signaling data on the signaling lines 355 and 355A is transmitted from the processor 410 (FIG. 4) to the cellular telephone 305 and 305A through the cellular phone docking station 310. The cellular telephones 305 and 305A subsequently dial telephone numbers indicated by the signaling data on the signaling lines 355 and 355A, thereby allowing the POTS devices 140, 150 and 150, 150A to make telephone calls using the cellular network 1320.

The audio relay 365 is configured to exchange analog-audio signals 345 between the POTS devices 140, 150 and 140A, 150A and the cellular phone docking station 310. In this sense, for incoming calls, the audio relay 365 receives the analog-audio signals 345 from the cellular phone docking station 310 and transmits the analog-audio signals 345 to the POTS devices 140, 150 through the POTS connector (RJ11 connector) 380 or to the POTS devices 140A, 150A through the POTS connector (RJ11 connector)380A. Similarly, for outgoing analog-audio signals 345 (i.e., audio from the POTS devices 140, 150 and 140A, 150A, the analog audio signals 345 are received by the audio relay 365 from the POTS connectors 380 and 380A, and transmitted to the cellular telephones 305 and 305A through the cellular telephone docking station 310. Thus, the audio relay 365 provides a bi-directional communication link for the analog-audio signals 345 between the POTS devices 140, 150 and 140A, 150A and the cellular telephones 305 and 305A, through the cellular phone docking station 310. In one illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370.

In this illustrative embodiment, the tone generator 375 discussed above with respect to FIG. 3, is configured to generate certain tones that are used by the POTS devices 140, 150 and 140A, 150A. A ring tone is generated in response to a ring enable signal transmitted from the interface controller 370 on the ring enable line 395. Different ring enable signals may be generated to cause the tone generator 375 to generate distinctive ring tones for the POTS devices 140, 150 and 140A, and 150A. The tone generator 375 is also configured to generate a dial tone and transmit the generated dial tone to the POTS telephones 140, 150 and 140A, 150B. The dial tone is generated in response to a dial enable signal on dial enable line 390.

While several hardware components are shown with reference to FIGS. 3, 4, and 13 to describe the interface controller 370, it will be clear to one of ordinary skill in the art that the interface controller 370 may be implemented in hardware, software, firmware, or a combination thereof. In one illustrative embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an application specific integrated circuit (ASIC) having appropriate combinational logic gates, a programmable gate array (PGA), a field programmable gate array (FPGA), etc.

Figure 14:
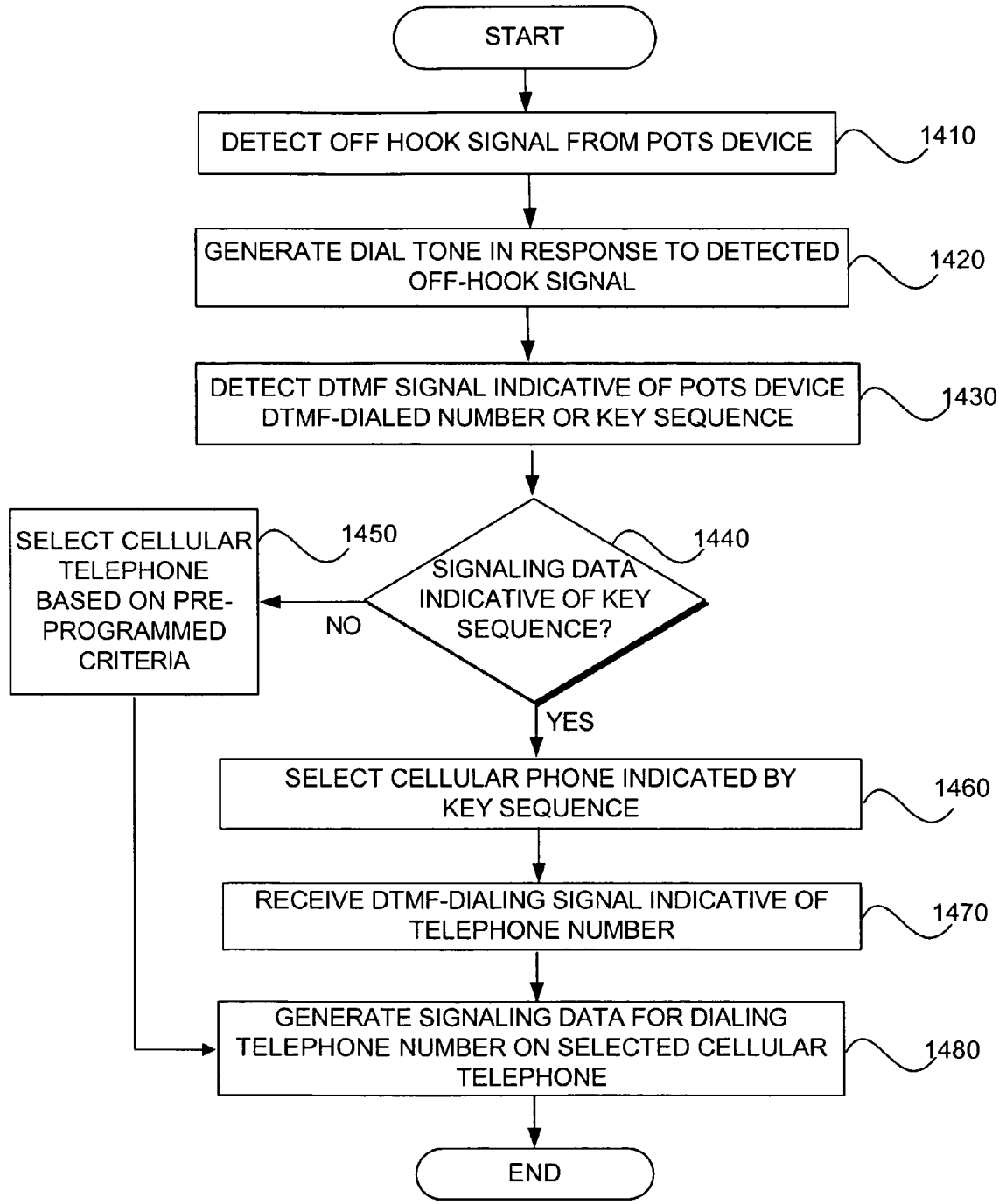
FIGS. 14 through 15 are flowcharts showing several illustrative embodiments of the method associated with selectively interfacing POTS devices with cellular devices in communication with a cellular network.

FIG. 14 is a flowchart showing an illustrative embodiment of a method for selectively interfacing the POTS devices 140, 150 and 140A, 150A with the cellular telephones 305 and 305A. As shown in FIG. 14, after a user "picks up" the phone 140 (for example) to place an outgoing call, the interface controller 370 detects, in step 1410, an off-hook signal at the off-hook/pulse detector 430 (FIG. 4). The interface 240 then generates, in step 1420, a dial tone in response to the detected off-hook signal. In an illustrative embodiment, the dial tone may be generated by the tone generator 375. In particular, the generated dial tone is conveyed to the POTS device 140 (i.e., to the person that is placing the outgoing call) to indicate that the interface 240 is ready for dialing one of the cellular telephones 305 or 305A.

The DTMF decoder 420 (FIG. 4) then detects, in step 1430, a DTMF signal that is indicative of a DTMF-dialed telephone number or key sequence representative of a specific one of the cellular telephones 305 or 305A, from the POTS device 140. For instance, the cellular telephone 305 may correspond to the key sequence "#1" and the cellular telephone 305A may correspond to the key sequence "#2." It should be appreciated that the interface controller 370 may be configured so that a user may store key sequences corresponding to the cellular telephones 305 and 305A in a memory such as the ROM 440 (FIG. 4).

The processor 410 (FIG. 4) parses the DTMF signal received by the DTMF decoder 420 (FIG. 4) to determine, in step 1440, if the DTMF signal is indicative of a DTMF-dialed telephone number or a key sequence. If, in step 1440, the processor 410 (FIG. 4) determines that the DTMF signal is indicative of a key sequence then, in step 1460, the processor 410 (FIG. 4) selects one of the cellular telephones 305 or 305A represented by the key sequence. In particular, the processor 410 (FIG. 4) may be configured to compare the key sequence in the DTMF signal to a set of key sequences stored in the ROM 440 (FIG. 4) to determine the appropriate cellular telephone and then generate signaling data to "select" the cellular telephone. The generated signaling data indicates that POTS device 140 off-hook and than an outgoing call may be initiated. For instance, if the key sequence "#2" corresponds to the cellular telephone 305A, then the processor 410 (FIG. 4) would generate signaling data on the signaling line 355A to the cellular telephone 305A through the docking station 310, thereby indicating to the cellular telephone 305A that a user has "picked up" the POTS device 140, and that an outgoing call may be initiated. It will be appreciated that the selection of the key sequence based on knowledge of a particular calling plan subscribed to by the user on either cellular telephone. For instance, a user aware that free minutes are available on the calling plan subscribed to by the cellular telephone 305A may want all outgoing calls placed on the cellular telephone 305A until the minutes are used up.

Once the cellular telephone 305A has been selected by the processor 410 (FIG. 4) in step 1460, the processor 410 (FIG. 4) then receives, in step 1470 a DTMF-dialing signal indicative of a telephone number from the POTS device 140 through the DTMF decoder 420 (FIG. 4). In response to the DTMF signal, the processor 410 (FIG. 4) generates, in step 1480, signaling data on the signaling line 355A that is indicative of the DTMF-dialed number. It will be appreciated that the signaling data on the signaling line 355A may be conveyed to the cellular telephone 305A, either with or without modification, by the processor 410 (FIG. 4) through the docking station 310. Thus, the POTS device 140 initiates a telephone call on the selected cellular telephone 305A.

Returning now to step 1440, if the processor 410 (FIG. 4) determines that the DTMF signal is indicative of a telephone number then, in step 1450, the processor 410 (FIG. 4) selects, in step 1450, one of the cellular telephones 305 or 305A based on a pre-programmed criteria for routing the DTMF signal to the appropriate cellular telephone. In particular, the interface controller 370 may be configured to route signaling from the POTS device 140 to one of the cellular telephones 305 or 305A based on a unique calling plan feature, for example. For instance, the cellular telephone 305 may be subscribed to a plan which does not offer free weekend minutes while the cellular telephone 305A may be subscribed to a plan which offers free unlimited weekend calling. In this example, the processor 410 (FIG. 4) may be configured to select the cellular telephone offering the best value for the user (i.e., the cellular telephone 305A). Thus, in the above example, the processor 410 (FIG. 4) may be configured to generate, in step 1470, signaling data on the signaling line 355A to the cellular telephone 305A through the docking station 310, thereby indicating to the cellular telephone 305A that a user has "picked up" the POTS device 140, and that an outgoing call may be initiated. It should be appreciated that other criteria may also be utilized and that the criteria may be stored in memory, such as the ROM 440 (FIG. 4), and be accessed by the processor 410 (FIG. 4). The processor 410 (FIG. 4) in combination with other components in the interface controller 370, may retrieve the criteria data and make appropriate decisions based on, for example, the current day of the week or time of day.

Figure 15:
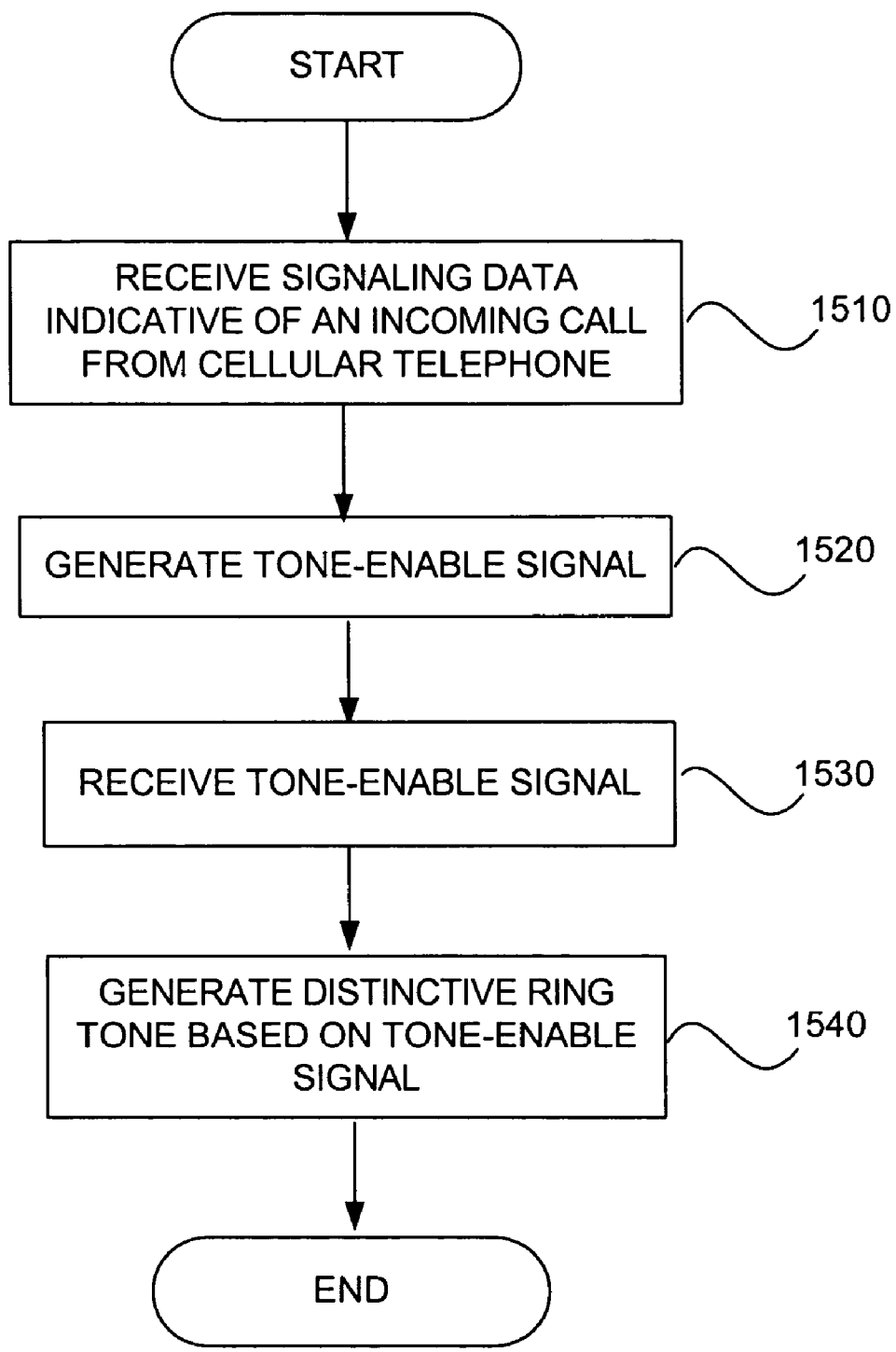

FIG. 15 is a flowchart showing an illustrative embodiment of a method for selectively signaling the POTS devices 140, 150 and 140A, 150A when receiving telephone calls from the cellular telephones 305 and 305A. As shown in FIG. 15, after a telephone call is received by one of the cellular telephones 305 or 305A from the cellular network 1320, the docking station 310 generates signaling data which is received, in step 1510, at the interface controller 370 via the signaling lines 355 and 355A. The processor 410 (FIG. 4) then generates, in step 1520, a tone-enable signal based on the signaling line from which the signaling data was received in step 1510. In particular, the processor 410 (FIG. 4) may be configured to generate a unique tone-enable signal for signaling data received from each of the cellular telephones 305 and 305A.

After generating the tone-enable signal the tone generator 375 receives, in step 1530, the tone-enable signal from the processor 410 (FIG. 4) via the ring enable line 395. The tone generator 375 then generates, in step 1540, a distinctive ring tone for the POTS devices 140, 140A, or 150 and 150A, based on the received tone-enable signal. For instance, the processor 410 (FIG. 4) may be configured to generate a tone-enable signal which causes the tone generator 375 to generate three short rings for signaling received on the signaling line 355 from the cellular telephone 305. The processor 410 (FIG. 4) may further be configured to generate a tone-enable signal which causes the tone generator 375 to generate three long rings for signaling received on the signaling line 355A from the cellular telephone 305A. Thus, a user of any of the POTS devices 140, 140A, 150, or 150B would be able to determine from which cellular telephone a call had been received based on the distinctive ring.

It will be appreciated by those skilled in the art, that in an alternative illustrative embodiment, the interface controller 370 may be configured to generate signaling representing an audible prompt, such as a synthesized voice message, via a connected speaker (not shown) to audibly inform a user which of the cellular telephones 305 and 305A has been selected. In this illustrative embodiment, the processor 410 (FIG. 4) may be configured to generate signaling containing a synthesized voice, instead of or in addition to the ring-enable signal 395, in response to signaling received on the signaling lines 355 and 355A from the docking station 310. It will be appreciated that various synthesized voices or other audible prompts may be stored as audio files in the memory, such as the ROM 440 (FIG. 4), in the interface controller 370. The processor 410 (FIG. 4) may be further configured to select one of the stored audio files based upon the signaling received from the docking station 310 and to generate signaling on a signaling line connected to the speaker to audibly play the prompt to a user. For example, in response to signaling on the signaling line 355A, the processor 410 (FIG. 4) may generate signaling to the connected speaker to play a message such as "You have an incoming call on cellular telephone number 2."

While illustrative embodiments of the present invention have been shown and described, it will be apparent to those of ordinary skill in the art that a number of changes, modifications, or alterations to the invention as described may be made, none of which depart from the spirit of the present invention. For example, while the cellular telephones 305 and 305A (FIG. 13) are used as the bridge between the POTS devices 140, 150 and 140A, 150A and the cellular network, it will be clear to one of ordinary skill in the art that any type of cellular device may be used as a bridge, such as a cellular compatible personal digital assistant (FDA), cellular modem, or any other cellular device that is configured to transmit and receive data from a cellular network. These and other such changes, modifications, and alterations should therefore be seen as within the scope of the present invention.

We claim:

1. A system for interfacing plain old telephone system (POTS) devices with cellular devices in communication with a cellular network, comprising:

an interface configured to interface with a plurality of cellular telephones and a plurality of POTS devices, wherein the interface is configured to selectively convert a POTS compatible signal to one of a plurality of cellular network compatible signals, and wherein the interface is further configured to selectively convert a cellular network compatible signal to one of a plurality of POTS compatible signals, wherein the interface comprises:

an interface controller configured to generate a tone-enable signal, wherein the interface controller is further configured to transmit signaling data to each of the plurality of cellular telephones and wherein the interface controller comprises:

an off-hook sensor configured to detect when each of the plurality POTS devices is off-hook and generate an off-hook signal in response to detecting when each of the plurality of POTS device is off-hook; and a processor configured to receive the off-hook signal from the off-hook sensor and generate signaling data in response to the received off-hook signal, wherein the signaling data is indicative of each of the plurality of POTS devices being off-hook;

a tone generator configured to receive the tone-enable signal from the interface controller and generate a tone in response to the received tone-enable signal;

a dual tone multi-frequency (DTMF) decoder configured to detect a DTMF signal from each of the plurality of POTS devices and generate a DTMF-dialing signal in response to the detected DTMF signal, wherein the DTMF signal is indicative of a key sequence, and wherein the processor of the interface controller is configured to parse the DTMF signal for the key sequence and select one of the plurality of cellular telephones based on the key sequence, wherein parsing the DTMF signal for the key sequence comprises comparing the key sequence in the DTMF signal to a set of stored key sequences to determine the one of the plurality of cellular telephones to select; and a plurality of POTS connectors configured to couple the plurality of POTS devices to the interface.

2. The system of claim 1, wherein the interface comprises a docking station configured to interface with the plurality of cellular telephones.

3. The system of claim 2, wherein the docking station is further configured to convey signaling data to each of the plurality of cellular telephones.

4. The system of claim 2, wherein the docking station is further configured to convey signaling data from each of the plurality of cellular telephones.

5. The system of claim 1, wherein the tone-enable signal is a ring-enable signal, and the generated tone is a distinctive ring tone.

6. The system of claim 1, wherein the interface controller is further configured to receive signaling data from each of the plurality of cellular telephones.

7. The system of claim 1, wherein the processor is further configured to:

receive the DTMF-dialing signal from the DTMF decoder.

8. The system of claim 1, wherein the processor is further configured to receive the DTMF-dialing signal from the DTMF decoder and generate signaling data in response to the received DTMF-dialing signal, wherein the signaling data is configured to instruct the selected one of the plurality of cellular telephones to dial the number indicated by the DTMF-dialing signal.

9. The system of claim 1, wherein the processor is further configured to receive signaling data, wherein the received signaling data is indicative of an incoming telephone call from one of the plurality of cellular telephones.

10. The system of claim 9, wherein the processor is further configured to generate a ring-enable signal in response to the received signaling data indicative of the incoming telephone call from the one of the plurality of cellular telephones and transmit the ring-enable signal to the tone generator.

11. A method for interfacing plain old telephone system (POTS) devices with cellular devices in communication with cellular networks, comprising:

selectively converting a POTS compatible signal to one of a plurality of cellular network compatible signals, wherein selectively converting a POTS compatible signal to one of a plurality of cellular network compatible signals comprises:

detecting when one of a plurality of POTS devices is off-hook;

generating an off-hook signal in response to detecting when the one of the plurality of POTS device is off-hook;

receiving the off-hook signal from the off-hook/pulse detector;

generating signaling data in response to the received off-hook signal, wherein the signaling data is indicative of the one of the plurality of POTS devices being off-hook detecting a DTMF signal from the one of the plurality of POTS devices; and generating a DTMF-dialing signal in response to the received DTMF signal, wherein the DTMF signal is indicative of a key sequence;

parsing the DTMF signal for the key sequence, wherein parsing the DTMF signal for the key sequence comprises comparing the key sequence in the DTMF signal to a set of stored key sequences to determine one of a plurality of cellular telephones to select; and selecting the one of a plurality of cellular telephones based on the key sequence; and selectively converting a cellular network compatible signal to one of a plurality of POTS compatible signals.

12. The method of claim 11, wherein selectively converting a POTS compatible signal to one of a plurality of cellular network compatible signals further comprises:

receiving the DTMF-dialing signal from the DTMF decoder.

13. The method of claim 11, wherein selectively converting a POTS compatible signal to one of a plurality of cellular network compatible signals further comprises:

receiving the DTMF-dialing signal from the DTMF decoder;

generating signaling data in response to the received DTMF-dialing signal, wherein the signaling data is configured to instruct the selected one of the plurality of cellular telephones to dial the number indicated by the DTMF-dialing signal.

14. The method of claim 11, wherein selectively converting a cellular network compatible signal to one of a plurality of POTS compatible signals comprises receiving signaling data, wherein the received signaling data is indicative of an incoming telephone call from one of the plurality of cellular telephones.

15. The method of claim 14, wherein selectively converting a cellular network compatible signal to one of a plurality of POTS compatible signals comprises:

generating a tone-enable signal from an interface upon receiving the signaling data;

receiving the tone-enable signal from the interface; and generating a tone in response to the received tone-enable signal.

16. The method of claim 15, wherein the tone-enable signal is a ring-enable signal, and the generated tone is a distinctive ring tone.

17. A computer-readable medium having computer-executable instructions stored thereon which, when executed by a computer, will cause the computer to perform a method for interfacing plain old telephone system (POTS) devices with cellular devices in communication with cellular networks, the method comprising:

selectively converting a POTS compatible signal to one of a plurality of cellular network compatible signals, wherein selectively converting a POTS compatible signal to one of a plurality of cellular network compatible signals comprises:

detecting when one of a plurality of POTS devices is off-hook;

generating an off-hook signal in response to detecting when the one of the plurality of POTS device is off-hook;

receiving the off-hook signal;

generating signaling data in response to the received off-hook signal, wherein the signaling data is indicative of the one of the plurality of POTS devices being off-hook;

detecting a DTMF signal from the one of the plurality of POTS devices;

generating a DTMF-dialing signal in response to the received DTMF signal, wherein the DTMF signal is indicative of a key sequence;

parsing the DTMF signal for the key sequence, wherein parsing the DTMF signal for the key sequence comprises comparing the key sequence in the DTMF signal to a set of stored key sequences to determine one of a plurality of cellular telephones to select; and selecting the one of the plurality of cellular telephones based on the key sequence; and selectively converting a cellular network compatible signal to one of a plurality of POTS compatible signals.

18. The computer-readable medium of claim 17, wherein selectively converting a POTS compatible signal to one of a plurality of cellular network compatible signals further comprises:

receiving the DTMF-dialing signal.

19. The computer-readable medium of claim 18, wherein selectively converting a POTS compatible signal to one of a plurality of cellular network compatible signals further comprises:

generating signaling data in response to the received DTMF-dialing signal, wherein the signaling data is configured to instruct the selected one of the plurality of cellular telephones to dial the number indicated by the DTMF-dialing signal.

20. The computer-readable medium of claim 17, wherein selectively converting a cellular network compatible signal to one of a plurality of POTS compatible signals comprises receiving signaling data, wherein the received signaling data is indicative of an incoming telephone call from one of the plurality of cellular telephones.

21. The computer-readable medium of claim 20, wherein selectively converting a cellular network compatible signal to one of a plurality of POTS compatible signals comprises:

generating a tone-enable signal from an interface upon receiving the signaling data;

receiving the tone-enable signal from the interface; and generating a tone in response to the received tone-enable signal.

22. The computer-readable medium of claim 21, wherein the tone-enable signal is a ring-enable signal, and the generated tone is a distinctive ring tone.

* * * * *